United States Patent [19]

Muszynski

[11] 4,435,883

[45] Mar. 13, 1984

[54] STRETCH RATIO CONTROL CIRCUIT FOR MULTIPLE STATION WEB STRETCHING APPARATUS

[75] Inventor: Jerome D. Muszynski, Cudahy, Wis.

[73] Assignee: Litton Industrial Products, Inc., Beverly Hills, Calif.

[21] Appl. No.: 306,463

[22] Filed: Sep. 28, 1981

[51] Int. Cl.³ .......................... D06C 3/00; H02P 7/00
[52] U.S. Cl. .......................................... 26/71; 28/245; 318/7; 425/66
[58] Field of Search .............. 26/74, 106, 71; 28/240, 28/245; 318/7, 67, 68, 77; 162/262; 425/66

[56] References Cited

U.S. PATENT DOCUMENTS

| | | |
|---|---|---|
| 2,447,209 | 8/1948 | Rendel et al. |
| 2,751,533 | 6/1956 | De La Bretoniere |
| 3,029,022 | 4/1962 | Horvath et al. |
| 3,118,097 | 1/1964 | Hettler |
| 3,364,404 | 1/1968 | Carlson |
| 3,447,050 | 5/1969 | Geis |
| 3,462,664 | 8/1959 | Lemon |
| 3,600,655 | 8/1971 | Karlin et al. |
| 3,701,933 | 10/1972 | Andersson ........................ 318/7 |
| 3,707,658 | 12/1972 | Hilsenbeck |
| 3,803,672 | 4/1974 | McGuffin et al. ................ 26/74 |
| 4,174,237 | 11/1979 | Hemming, Jr. et al. |

FOREIGN PATENT DOCUMENTS

| | | | |
|---|---|---|---|
| 2702029 | 7/1977 | Fed. Rep. of Germany ......... | 318/7 |
| 869334 | 1/1961 | United Kingdom | |
| 859669 | 5/1961 | United Kingdom | |
| 396136 | 1/1974 | U.S.S.R. ............................... | 318/7 |

*Primary Examiner*—Robert Mackey
*Attorney, Agent, or Firm*—John M. Haurykiewicz; Walter R. Thiel

[57] ABSTRACT

A control circuit for apparatus stretching a web between intake, discharge, and intermediate pulling stations (20-1, 20-2, 20-3). The circuit includes a first signal generator (32) for providing a signal to the intake discharge station (20-1) corresponding to the desired speed of the web at that station. A multiplier (40) alters the first signal in accordance with the amount of overall stretching, or stretch ratio, desired in the apparatus. The multiplier provides a second signal to the discharge station (20-3) corresponding to the speed of the web at the discharge station necessary to obtain the overall stretching. A second signal generator (48-66) subtracts a selected amount of the difference between the first and second signals from the second signal to provide a third signal to the intermediate pulling station (20-2) that distributes the overall stretching in the apparatus between intermediate zones formed by the adjacent pulling stations.

8 Claims, 5 Drawing Figures

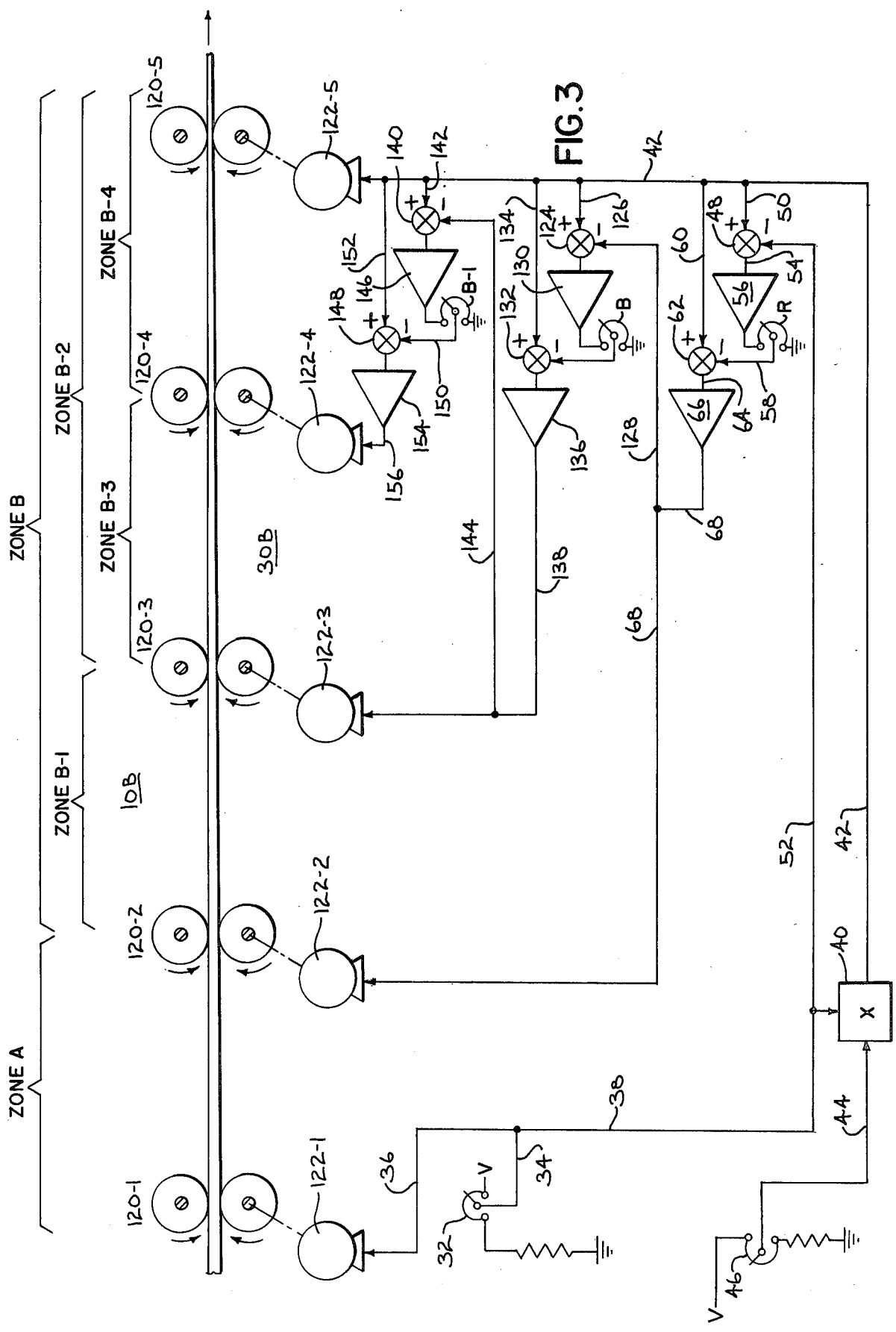

STRETCH RATIO CONTROL CIRCUIT FOR MULTIPLE STATION WEB STRETCHING APPARATUS

In processing many types of materials, the material must be elongated or stretched. For example, plastic films of polyethylene or polypropylene are stretched to orient the film and increase film strength in the direction of stretching. Stretching may also be used to determine the thickness, or gauge, of the film. Film can be stretched by passing it through a series of pull roll stations in which the film is moved faster at the downstream station than at the upstream station.

Inasmuch as the stretching determines the film strength, gauge, and other significant properties, the amount of such stretching and its control is of considerable importance in establishing the properties of the finished product.

The amount of stretch applied to the material is often stated in terms of a stretch ratio, that is, the ratio of the speed of the material at the downstream station to the speed of the material at the upstream station. In processing plastic films, stretch ratios of 5:1 or 8:1 are not uncommon. These are many times greater than the draw used in connection with materials such as paper that are typically stated in percentages, such as 2% or 5%. A stretch ratio of 5:1 on a percentage basis is 500%.

To facilitate the processing of a film web, the stretching is typically carried out with three or more pull roll stations arranged in tandem along the web in a web stretching apparatus. The overall stretch ratio applied to the film is the ratio of the speed of the web at the discharge station of the apparatus to the speed of the web at the intake station of the apparatus. The overall stretch ratio is the product of the individual stretch ratios developed in the intermediate zones between each pair of adjacent pull roll stations in the apparatus.

It is frequently necessary to change the stretch ratio developed in one or more zones of the apparatus. This may be done for a variety of reasons. For example, it may be carried out to limit the loading of one or more of the motors driving the pull roll stations or to equalize the loading of these motors. The amount of stretching that may be carried out on the web is related to its temperature. Changes in the temperature of the web at various points along its length requires changes in the stretching carried out in the various zones of the apparatus.

Control circuitry has been developed for maintaining the stretch ratios as the line speed of the entire apparatus is increased or decreased. Control circuitry has also been developed by which when web speeds are altered in one zone of the apparatus to change the stretch ratio in that zone, compensating changes to the web speeds in all subsequent zones are made so that the stretch ratios developed in the subsequent zones remain unaffected. However, this causes the overall stretch ratio of the apparatus to change as the speed of the web at the discharge pull roll station will ultimately be altered. Since it is the overall stretch ratio of the apparatus that determines properties such as film strength and gauge of the finished product, changes in the overall stretch ratio may not be tolerable.

To keep the overall stretch ratio constant with such a control circuitry, two adjustments must be made. One is the desired alteration of the stretch ratio in the particular intermediate zone. The second is a compensating adjustment in another zone so that the overall stretch ratio remains the same. The need to make two adjustments may adversely affect the constancy of the overall stretch ratio. Given typical processing speeds, large amounts of scrap material may be produced while the operator of the apparatus makes and checks these adjustments. And, there is always the possibility that during the course of the adjustments, the downstream pull roll station will drive the web at a slower speed than the upstream station. This will cause slack rather than stretching to appear in the web. Not only do the properties of the web suffer, the web may be broken if the slack is removed too rapidly.

It is, therefore, the object of the present invention to provide a control circuit by which the stretch ratio in one intermediate zone of a multi-zone web stretching apparatus may be altered without altering the overall stretch ratio of the apparatus. More specifically, the present invention provides a control circuit by which, when the stretch ratio in one intermediate zone or zones is changed, a compensating adjustment is automatically applied to another intermediate zone or zones to maintain constant overall stretch ratio in the apparatus. The control circuit may thus be viewed as one for distributing the overall stretch ratio of the web stretching apparatus among a plurality of intermediate zones while maintaining the overall stretch ratio constant. Should it be desired to change the overall stretch ratio or the line speed of the apparatus, the control circuit will maintain the proportionate amount of the overall stretching occurring in the intermediate zones constant. The control circuit of the present invention also prevents slack conditions from occurring in the web.

Briefly, the control circuit of the present invention inclues a first signal generator, such as a potentiometer, for providing a first signal to one of the intake or discharge pull roll stations corresponding to the desired speed of the web at that station. Typically, the first signal will be applied to the intake pull roll station. A multiplier, coupled to the first signal generator, alters the first signal in accordance with the amount of overall stretching desired in the apparatus and provides a second signal to the other of the intake or discharge stations corresponding to the speed of the web at the other station necessary to obtain the desired overall stretching of the web. The multiplier thus establishes the overall stretch ratio of the stretching apparatus.

A second signal generator provides a third signal to an intermediate pull roll station that defines the intermediate stretching zone in the apparatus. The second signal generator is coupled to the first signal generator and to the multiplier for deriving a signal indicative of the overall stretching occurring in the apparatus as by subtracting the first signal from the second signal at a summing junction. A portion of that signal, selected in accordance with the desired distributor of the overall stretching between the intermediate zones, is subtracted from the second signal at a second summing junction to provide the third signal to the intermediate pull roll station to provide the web speed at that station necessary to obtain the desired distribution. Through the subtraction occurring in the second signal generator, the speed of the web at the intermediate station can never be greater than the intake station web speed or less than the discharge station web speed. Slack in the web is thus avoided.

The present invention will be further explained with the aid of the accompanying drawings in which:

FIG. 3 is a schematic diagram of a further modification of the control circuit of the present invention; and FIG. 4 is a partial schematic diagram of a potentiometer multiplier that may be used in the circuit of the present invention.

Figure 1:
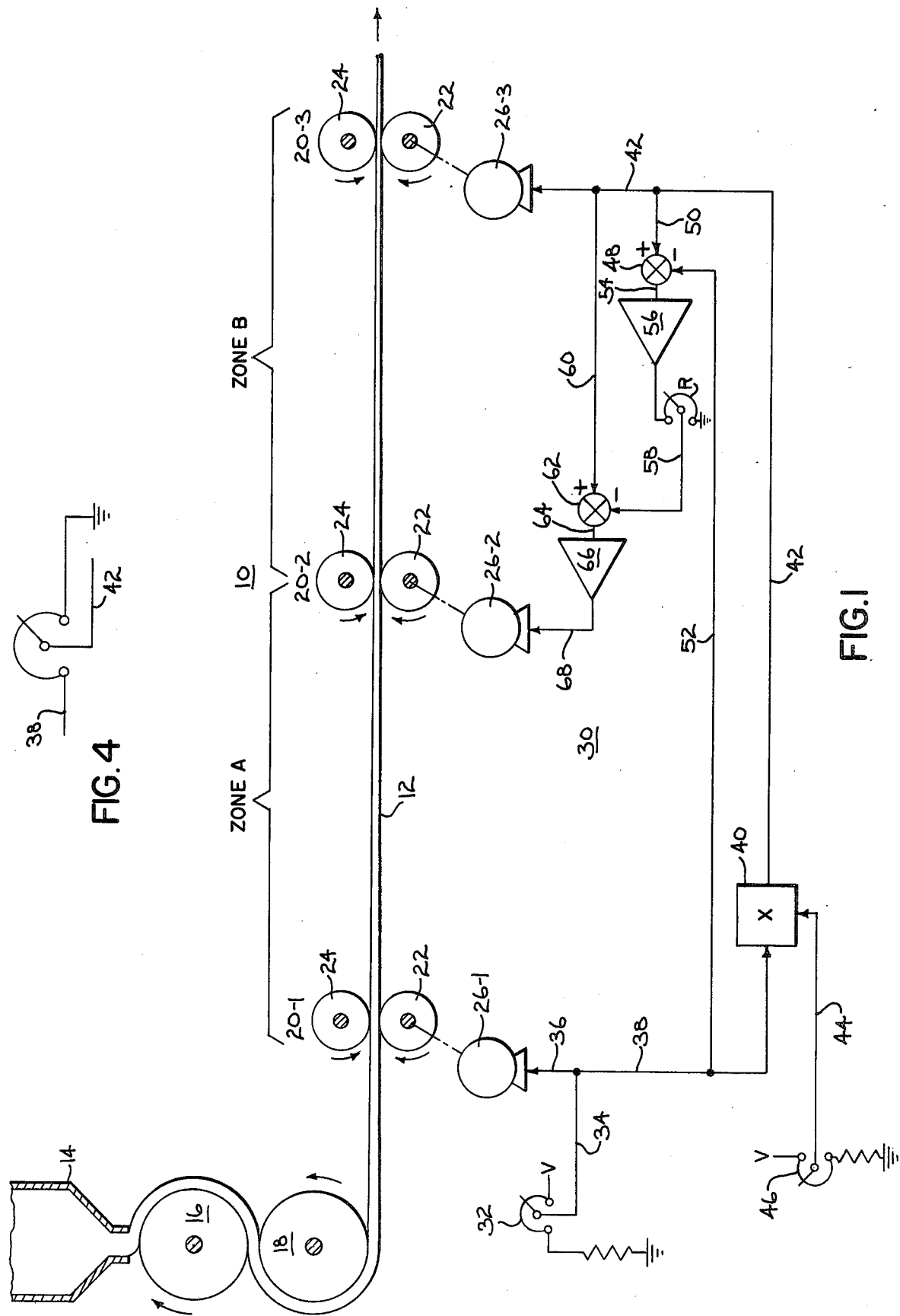
FIG. 1 is a schematic diagram of a simplified embodiment of the stretch ratio control circuit.

FIG. 1 exemplarly shows a web stretching apparatus 10 as that for stretch orienting web 12 that may comprise a plastic film. Extruder 14 casts the plastic, such as polyethylene or polypropylene, on chill roll 16. A take off apparatus, diagrammatically shown as roll 18 removes the film from the chill roll and provides it to stretching apparatus 10.

Stretching apparatus 10 includes a plurality of pull roll stations, three of which are indicated as 20-1, 20-2, and 20-3. In each pull roll station, web 12 may pass through a nip formed by a pair of pull rolls comprising driven roll 22 and idler roll 24. In actual practice, rolls 22 and 24 are usually arranged to provide an S-wrap to the web, similar to rolls 16 and 18. Drive rolls 22 of pull roll stations 20-1, 20-2, and 20-3, are driven by motors 26-1, 26-2, and 26-3, respectively.

To stretch web 12, the downstream pull rolls are driven faster than upstream pull rolls so that a tensile force is applied to the web between two adjacent pull roll stations. The amount of stretching to which web is subjected depends on the difference in the speeds of the web at the two adjacent stations.

As noted above, the amount of stretching to which the web is subjected is usually defined in terms of a stretch ratio: that is, the ratio of the speed of the web at the downstream station to the speed of the web at the upstream station.

The overall stretch ratio of stretching apparatus 10 is determined by the speed $S_3$ of the web at the discharge pull roll station, i.e., pull roll station 20-3, and the speed $S_1$ of the web at the intake pull roll station, i.e. pull roll station 20-1 and is defined as $S_3/S_1$. The overall stretch ratio determines film properties such as film gauge, film strength, and the like; and is established by the criteria for these properties.

By controlling the operation of intermediate pull roll station 20-2, the overall stretch ratio may be distributed between zone A established between pull roll station 20-1 and pull roll station 20-2 and zone B established between pull roll station 20-2 and pull roll station 20-3. Thus, if pull roll station 20-2 is driven at the same speed as pull roll station 20-1, all of the stretching of web 12 will take place in zone B. If pull roll station 20-2 is driven at the same speed as pull roll station 20-3, all of the stretching will take place in zone A.

If pull roll station 20-2 is driven at some speed between the speeds of pull roll stations 20-1 and 20-3, part of the stretching will occur in zone A and part will occur in zone B. The distribution of the stretching will be determined by the speed of pull roll station 20-2.

Also as noted above, it is often desired to control the amount of stretching occurring in each of intermediate zones A and B without altering the overall stretch ratio and the properties of the finished film. This may be desired to accommodate the temperatures of web 12 along its length, to adjust or equalize the loading of motors 26-1, 26-3, and 26-3, or for other reasons. This distribution of the overall stretch ratio between zones A and B is carried out by control circuit 30 of the present invention.

Control circuit 30 includes signal generator 32 providing a signal proportional to the desired speed $S_1$ of web 12 at intake pull roll station 20-1 in conductor 34. The speed $S_1$ of the web at intake pull roll station 20-1 is coordinated with the operation of extruder 14 and rolls 16 and 18 and is often termed the "line speed" of apparatus 10. Signal generator 34 is shown as a potentiometer in FIG. 1 for explanatory purposes. It will be appreciated that the signal generator may, in practice, be incorporated in the apparatus for casting web 12.

The signal in conductor 34 is provided to motor 26-1 in conductor 36. While control circuit 30 is shown in simplified form in FIG. 1 to facilitate an explanation of its construction and operation, it will be appreciated that amplification and power control circuitry, not shown, will be provided at the input of motor 26-1 to control the motor responsive to the signal in conductor 36.

The signal in conductor 34 is also provided in conductor 38 to the input of multiplier 40. Multiplier 40 determines the overall stretch ratio of stretching apparatus 10 by providing an output signal in conductor 42 to motor 26-3 that is a predetermined multiple of the input signal in conductor 38. For example, if a 5:1 stretch ratio is desired, a signal is provided in conductor 42 that will so drive motor 26-3 as to cause the speed $S_3$ of web 12 at pull roll station 20-3 to be five times greater than the speed $S_1$ of the web at pull roll station 20-1. In the simplified embodiment of control circuit 30 shown in FIG. 1, the magnitude of the signal in conductor 42 may be seen as five times the magnitude of the signal in conductor 38. In actual practice, the size of rolls 22 and 24 at the two pull roll stations may be different, or motors 26 may have gearing associated with them that will cause the signal in conductor 42 to assume some other value. Appropriate scaling circuitry is provided in control circuit 30 to coordinate the signal levels within the circuitry. Multiplier 40 may be a semiconductor signal multiplier of the type available from Analog Devices Company of Norwood, Mass. as item AD534 or from RCA as item CA309ID. The amount of multiplication provided is determined by the magnitude of the input signal in conductor 44 from a signal generator 46, such as a potentiometer. When fractional multiplication is desired, a potentiometer between conductors 38 and 42 will suffice, as shown in FIG. 4.

As the overall stretch ratio of apparatus 10 is established by the amount of multiplication provided by multiplier 40, adjustment of only a single element, such as signal generator 46 is required to set that stretch ratio. And, as noted supra and infra, the overall stretch ratio established by the setting of signal generator 46 does not vary as the overall stretch ratio is distributed between zones A and B.

The means used to generate the signal to intermediate pull roll station 20-2 includes summing junction 48 connected to conductor 42 through conductor 50 and to conductor 38 through conductor 52. Summing junction 48 provides an output signal in conductor 54 proportional to the difference between the signals in conductor 42 and conductor 38 or $S_3 - S_1$. The signal $S_3 - S_1$ corresponds to the amount of overall stretching occurring in apparatus 10.

The signal in conductor 54 is passed through unity gain buffer amplifier 56 to potentiometer R, the wiper of which provides a selected portion of the $S_3-S_1$ signal in conductor 58 or $R(S_3-S_1)$. The signal may include all of the signal in conductor 54, none of that signal, or some intermediate portion thereof.

The signal in conductor 58 and a signal in conductor 60 corresponding to the signal in conductor 42 or speed $S_3$ of the web at pull roll station 20-3 are supplied to a second summing junction 62 that subtracts the signal in conductor 58 from the signal in conductor 60 and provides a difference signal in conductor 64 corresponding to $S_3-R(S_3-S_1)$. The signal in conductor 64 is provided through unity gain amplifier 66 to motor 26-2 in conductor 68 to control the speed $S_2$ of web 12 at pull roll station 20-2.

In operation, potentiometer 32 is adjusted to establish the speed of motor 26-1 and the speed $S_1$ of web 12 at pull roll station 20-1. Potentiometer 46 is adjusted to operate multiplier 40 and establish the overall stretch ratio: that is, the ratio between the speed $S_3$ of the web at pull roll station 20-3 and the speed $S_1$ of the web at pull roll station 20-1 or $S_3/S_1$.

The adjustment of potentiometer R determines the speed $S_2$ of web 12 at pull roll station 20-2 and the distribution of the overall stretch ratio between zone A and zone B by providing for the subtraction of a selected portion of the signal $S_3-S_1$, corresponding to the overall stretching in apparatus, from the web speed $S_3$ signal at summing junction 62. If potentiometer R is set at zero, there will be no signal in conductor 58. The signal in conductor 64 is that of conductor 42 corresponding to $S_3$ and the speed $S_2$ of the web at pull roll station 20-2 is the same as the speed of the web at pull roll station 20-3 so that all the stretching occurs between pull roll station 20-1 and 20-2 in zone A.

If potentiometer R is set to provide all of the signal $S_3-S_1$ from summing junction 48, the speed $S_2$ of web 12 at pull roll station 20-2 will be the same as the speed $S_1$ at pull roll station 20-1 and all the stretching will occur between pull roll station 20-2 and pull roll station 20-3 in zone B. This is because the signal at summing junction 62 will be $S_3-[S_3-S_1]$, that reduces to $S_3-S_3+S_1$, or simply to $S_1$.

If potentiometer R is set at some intermediate value, the overall stretching will be distributed between zone A and zone B in some desired manner in accordance with the setting of the potentiometer. For example, if potentiometer R is set to provide half the difference signal $S_3-S_1$ at summing junction 48 in conductor 58, equal amounts of stretching will be developed in zone A and in zone B.

From the foregoing it will be appreciated that the distribution of the stretching between zones A and B is carried out without altering the overall stretch ratio of stretching apparatus 10 that is established by potentiometer 46. However, should it be desired to change the overall stretch ratio, control circuit 10 will maintain the proportionate amount of the overall stretching occurring in each of zones A and B constant. The same is true for changes in line speed. It will be further appreciated that the speed $S_2$ of web 12 at pull roll station 20-2 can never be greater than speed $S_3$ at pull roll station 20-3 or less than the web speed $S_1$ at pull roll station 20-1. This insures that no slack can occur in web 12 that could interfere with proper handling or treatment of the web.

Figure 2:
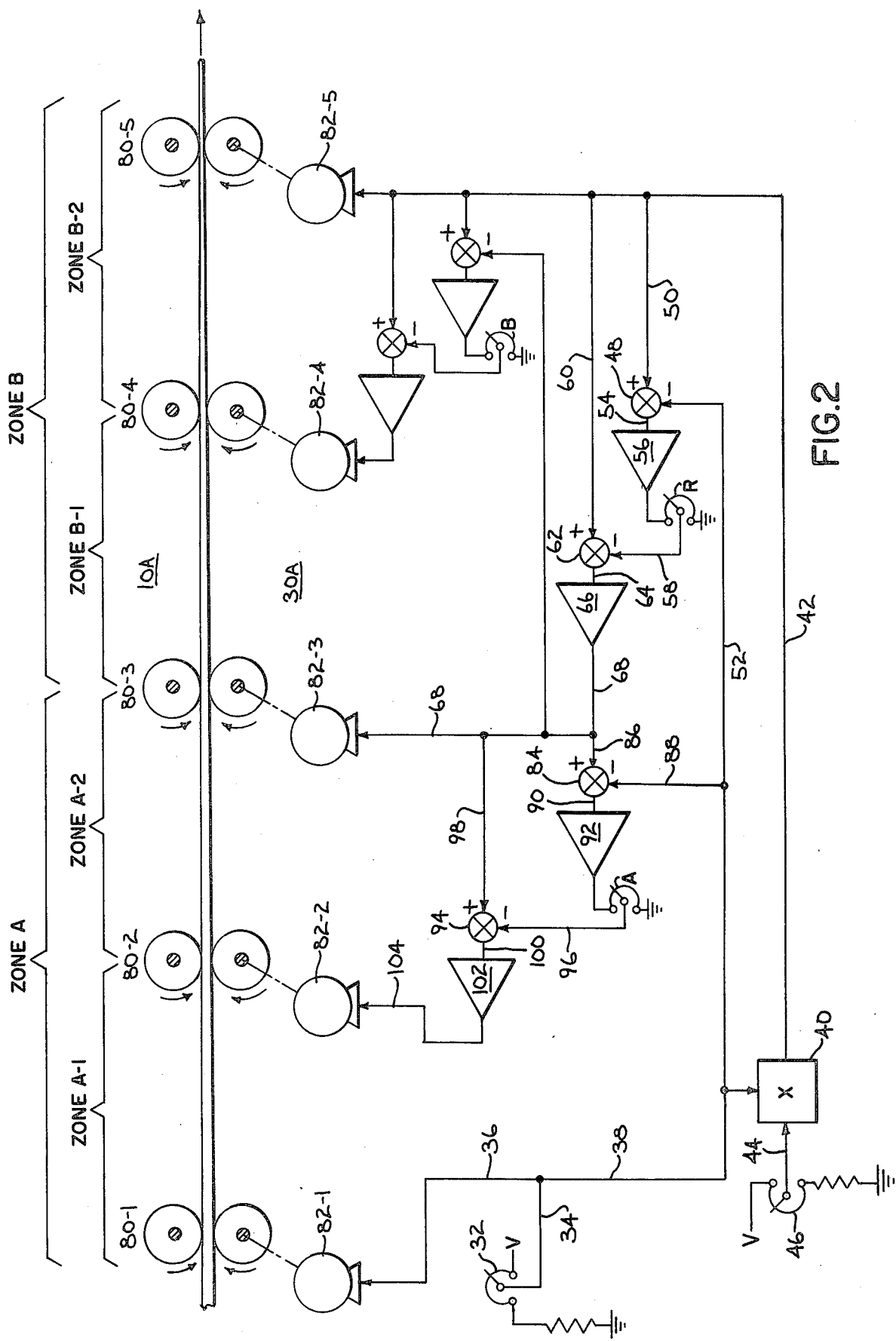
FIG. 2 is a schematic diagram of a modification of the control circuit shown in FIG. 1.

While control 30 has been shown in FIG. 1 in conjunction with three pull roll stations, it can be employed in stretching apparatus having a greater number of pull roll stations, if desired. FIG. 2 shows a stretching apparatus 10A having five pull roll stations 80-1, 80-2, 80-3, 80-4, and 80-5 driven by motors 82-1, 82-2, 82-3, 82-4, and 82-5. FIG. 2 also shows control circuit 30A. For control purposes, stretching apparatus 10A may be divided into two main control zones A and B. Zone A extends from pull roll station 80-1 to pull roll station 80-3. Zone B extends from pull roll station 80-3 to pull roll station 80-5. Each of zones A and B may be divided into subzones. Zone A is divided into subzone A-1 extending between pull roll station 80-1 and pull roll station 80-2 and subzone A-2 extending between pull roll station 80-2 and pull roll station 80-3. Zone B is divided into subzone B-1 extending between pull roll station 80-3 and pull roll station 80-4 and subzone B-2 extending between pull roll station 80-4 and pull roll station 80-5.

In FIG. 2, elements common to FIG. 1 have been given the same identifying designation. Thus, potentiometer 32 provides a signal in conductors 34 and 36 corresponding to the desired web speed $S_1$ at intake pull roll station 80-1. The same signal is applied to multiplier 40 in conductor 38 that provides a signal in conductor 42 to discharge pull roll station 80-5 in accordance with the desired discharge web speed $S_5$ to determine the overall stretch ratio $S_5/S_1$ of stretching apparatus 10A. Summing junction 48, amplifier 56, potentiometer R, summing junction 62, and amplifier 66 to provide a signal $S_3$ in conductor 68 to pull roll station 80-3 that distributes the overall stretch ratio of stretching apparatus 10A between zones A and B in a manner corresponding to that described above in connection with FIG. 1.

Similar circuitry is employed to distribute the stretching occurring in zone A between subzone A-1 and subzone A-2. Thus, the signal corresponding to the speed $S_3$ of the web at pull roll station 80-3 in conductor 68 is provided to summing junction 84 in conductor 86. The signal corresponding to the speed $S_1$ of the web at pull roll station 80-1 in conductor 52 is provided to summing junction 84 in conductor 88. The difference signal in conductor 90 is provided through unity gain amplifier 92 and potentiometer A to summing junction 94 in conductor 96. Summing junction 94 also receives the signal corresponding to the speed $S_3$ of the web at pull roll station 80-3 in conductor 98. The difference signal from summing junction 94 in conductor 100 is provided through unity gain amplifier 102 to motor 82-2 in conductor 104.

Operation of potentiometer A distributes the stretching occurring in zone A between subzones A-1 and A-2 in the same manner as that by which potentiometer R distributes the stretching between zones A and B.

The circuitry associated with potentiometer B also operates in the same manner to distribute the stretching occurring in zone B between subzone B-1 and subzone B-2 of zone B.

FIG. 3 shows a further embodiment of the stretch ratio control circuit 30B of the present invention suitable for use with stretching apparatus 10B in which the stretching zones are defined in a slightly different manner. In stretching apparatus 10B, zone A is established by pull roll station 120-1 and 120-2. Stretching zone B is established by pull roll station 120-2 and pull roll station 120-5. In stretching apparatus 10B shown in FIG. 3, zone B is further divided into zones B-1 and B-2 established by pull roll stations 120-2 and 120-3 and 120-3 and 120-5, respectively. Zone B-2 is then further subdivided into zones B-3 and B-4 established by pull roll station 102-3 and 102-4 and by pull roll station 120-4 and 120-5, respectively. The pull roll stations are driven by motors 122-1, 122-2, 122-3, 122-4, and 122-5.

As before, elements common to FIGS. 1 and 2 have been identified with similar designations in FIG. 3 so that elements 32 through 68 determine the overall stretch ratio $S_5/S_1$ for stretching apparatus 10B in accordance with the setting of potentiometer 46. These elements also determine the distribution of the stretching between zone A and zone B by virtue of the output signal $S_2$ in conductor 68.

To distribute the stretching occurring in zone B between zone B-1 and zone B-2, the signal corresponding to the web speed $S_5$ at pull roll station 120-5 in conductor 42 is provided to summing junction 124 in conductor 126. The signal corresponding to the speed $S_2$ of the web at pull roll station 120-2 in conductor 68 is provided to summing junction 124 in conductor 128. The output of summing junction 124 is provided through unity gain amplifier 130 and potentiometer B to summing junction 132, the other input of which is connected to conductor 42 and web speed signal $S_5$ by conductor 134.

The output of summing junction 132 is provided through unity gain amplifier 136 to conductor 138 to motor 122-3 driving pull roll station 120-3. Circuitry 124 through 138 operates to distribute the stretching occurring in zone B between zone B-1 and zone B-2.

To distribute the stretching occurring in zone B-2 between zones B-3 and B-4, the web speed signal $S_5$ in conductor 42 is provided to summing junction 140 in conductor 142. The speed signal $S_3$ of the web at pull roll station 120-3 in conductor 138 is provided to summing junction 140 in conductor 144. The output of summing junction 140 is provided through unity gain amplifier 146 and potentiometer B-1 to summing junction 148 in conductor 150. Summing junction 148 also receives the web speed signal $S_5$ in conductor 152. The output of summing junction 148 is provided through unity gain amplifier 154 to conductor 156 and to motor 122-4.

Operation of potentiometer B-1 distributes the stretching occurring in zone B-2 between zones B-3 and B-4.

The operation of control circuit 30B shown in FIG. 3 facilitates a prioritization of the stretching zones of apparatus 10B in a cascade-like fashion. Thus, by sequentially adjusting potentiometer R, potentiometer B, and potentiometer B-1, the stretching occurring in the individual zones can be established, beginning with the most upstream zone A, and continuing through to the most downstream zone B-4. The adjustment potentiometer R controls the stretching occurring in zone A and zone B. The adjustment of potentiometer B distributes the stretching occurring in zone B between zones B-1 and B-2. The adjustment of potentiometer B-1 distributes the stretching occurring in zone B-2 between zones B-3 and B-4.

Figure 5:
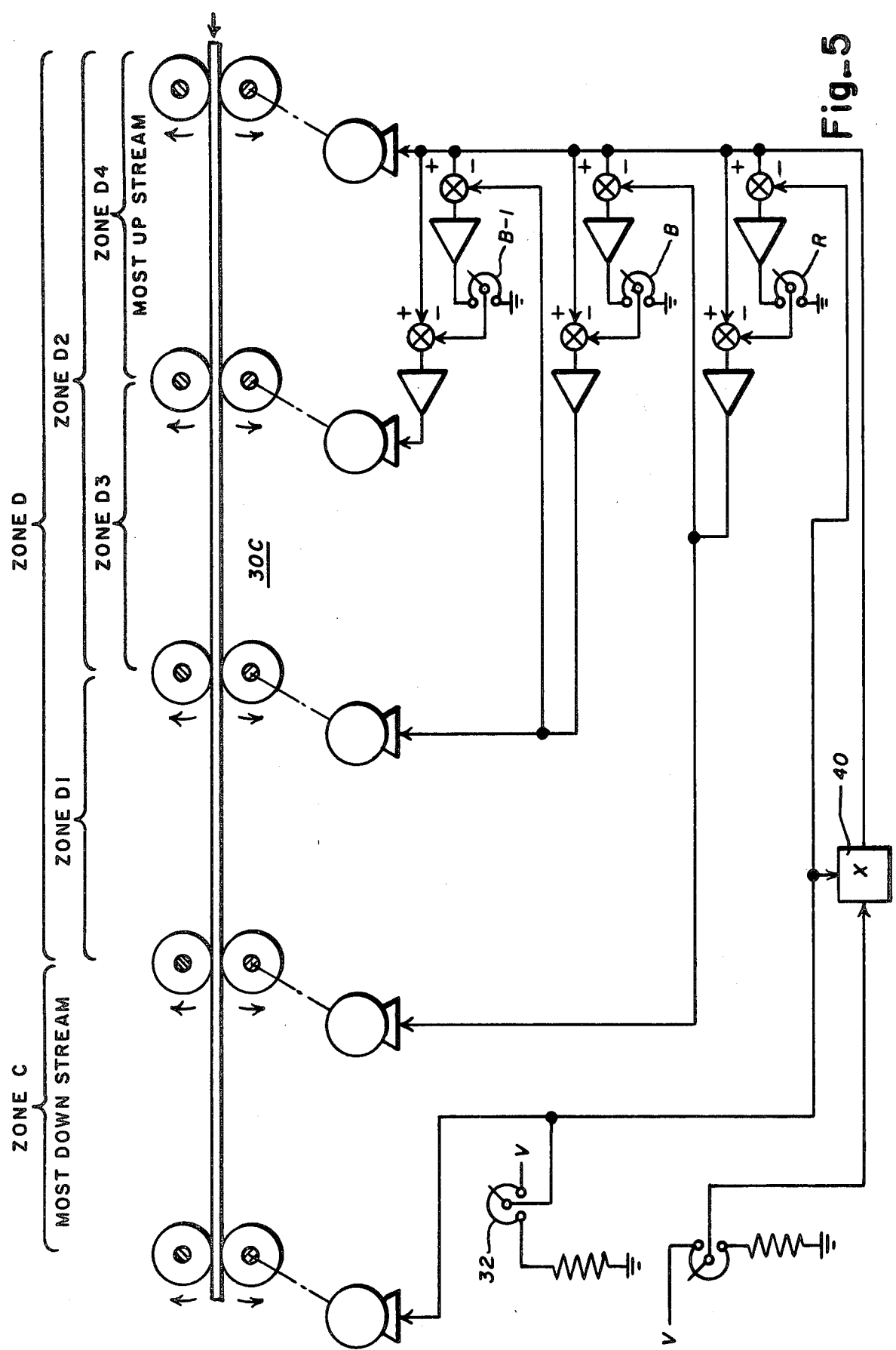
FIG. 5 is a schematic diagram of a still further modification of the control circuit of the present invention.

It will be appreciated that various other modifications of the control circuitry of the present invention are possible. For example, while signal generator 32 has been shown as controlling the speed of the intake pull roll station and multiplier 40 controlling the speed of the discharge pull roll station, signal generator 32 may be used to control the latter and multiplier 40 used to control the former, as shown in FIG. 5. The circuitry 30C shown in FIG. 5 may be so arranged that the zones are cascaded from the most downstream stretching zone to the most upstream stretching in a manner opposite to that shown in FIG. 3.

Various modes of carrying out the invention are contemplated as being within the scope of the following claims particularly pointing out and distinctly claiming the subject matter which is regarded as the invention.

I claim:

1. A control circuit for apparatus stretching a web between pulling stations of the type having pull rolls in driving engagement with the web whereby the speed of the web in contact with the pull rolls is equal to the surface speed of the pull rolls and wherein each pulling station is powered by an electronically controllable variable speed drive responsive to provide pull roll speed which is proportional to an electronic signal, the apparatus having an intake station receiving the web to be stretched, a discharge station for discharging the stretched web, and at least one intermediate station, the overall stretching of the web extending between the intake and discharge stations with intermediate stretching occurring in intermediate zones between adjacent stations, said control circuit comprising:

first signal generating means (32) for providing a first signal to one of the intake and discharge stations corresponding to the desired speed of the web at the one station;

multiplier means (40) coupled to said first signal generating means for altering the first signal in accordance with the amount of overall stretching desired in the apparatus and for providing a second signal having an equivalent speed offset to the other of the intake and discharge stations corresponding to the speed of the web at the other station and having an equivalent difference in speed from the first signal to obtain the desired overall stretching; and second signal generating means (50–68) coupled to said first signal generating means and to said multiplier means for deriving a signal indicative of the overall stretching and for reducing the discharge station signal by a selected amount of the signal indicative of the overall stretching to provide a third signal to the intermediate station distributing the overall stretching in the apparatus between the intermediate zones, wherein said third signal is obtained by subtracting a selected amount of the difference between said first and second signals from the discharge station signal.

2. The control circuit according to claim 1 wherein the apparatus has an additional station between the intermediate station and a selected one of the intake and discharge stations, and wherein said control circuit includes a third signal generating means (84–102) coupled to the means providing a signal to the station upstream of the additional station and to the means providing a signal to the station downstream of the additional station for deriving a signal indicative of the stretching between the upstream and downstream stations and for reducing the downstream station signal by a selected amount of the signal indicative of the stretching to provide a fourth signal to the additional station distributing the stretch between intermediate zones, wherein said fourth signal is obtained by subtracting a selected amount of the difference between the signals provided to the upstream and downstream stations from the downstream station signal.

3. The control circuit according to claim 1 wherein the apparatus has an additional station between the intermediate station and a selected one of the intake and discharge stations and wherein said control circuit includes third signal generating means (124–136 or 140–154) coupled to said means providing a signal to the selected station and to said signal generating means (50–68) for deriving a signal indicative of the stretching between the intermediate station and the selected station and for reducing the selected station signal by a selected amount to provide a fourth signal to the additional station distributing the stretching between zones defined by the intermediate station, additional station, and selected station, and wherein said fourth signal is obtained by subtracting a selected amount of the difference between the signals provided to the intermediate station and the selected station from the selected station signal.

4. The control circuit according to claim 1 wherein said second signal generating means includes first summing junction means (48) coupled to said first signal generating means (32) and to said multiplier means (40) for providing a difference signal proportional to the difference between said first and second signals; second summing junction means (62) coupled to said first summing junction means (48) and to said multiplier means (40) for providing said third signal; and ratio means (R) interposed between said first and second summing junction means for providing a selected amount of said difference signal to said second summing junction means.

5. The control circuit according to claim 4 including buffer means (56, 66) interposed at the outputs of said summing junction means.

6. The control circuit according to claim 4 wherein said ratio means is a potentiometer.

7. The control circuit according to claim 1 wherein said multiplier means (40) is a semiconductor signal multiplier means.

8. The control circuit according to claim 1 wherein said multiplier means (40) is a potentiometer.

* * * * *